June 11, 1935.  F. G. THWAITS  2,004,715
VALVE MECHANISM
Filed Nov. 18, 1932  3 Sheets-Sheet 1
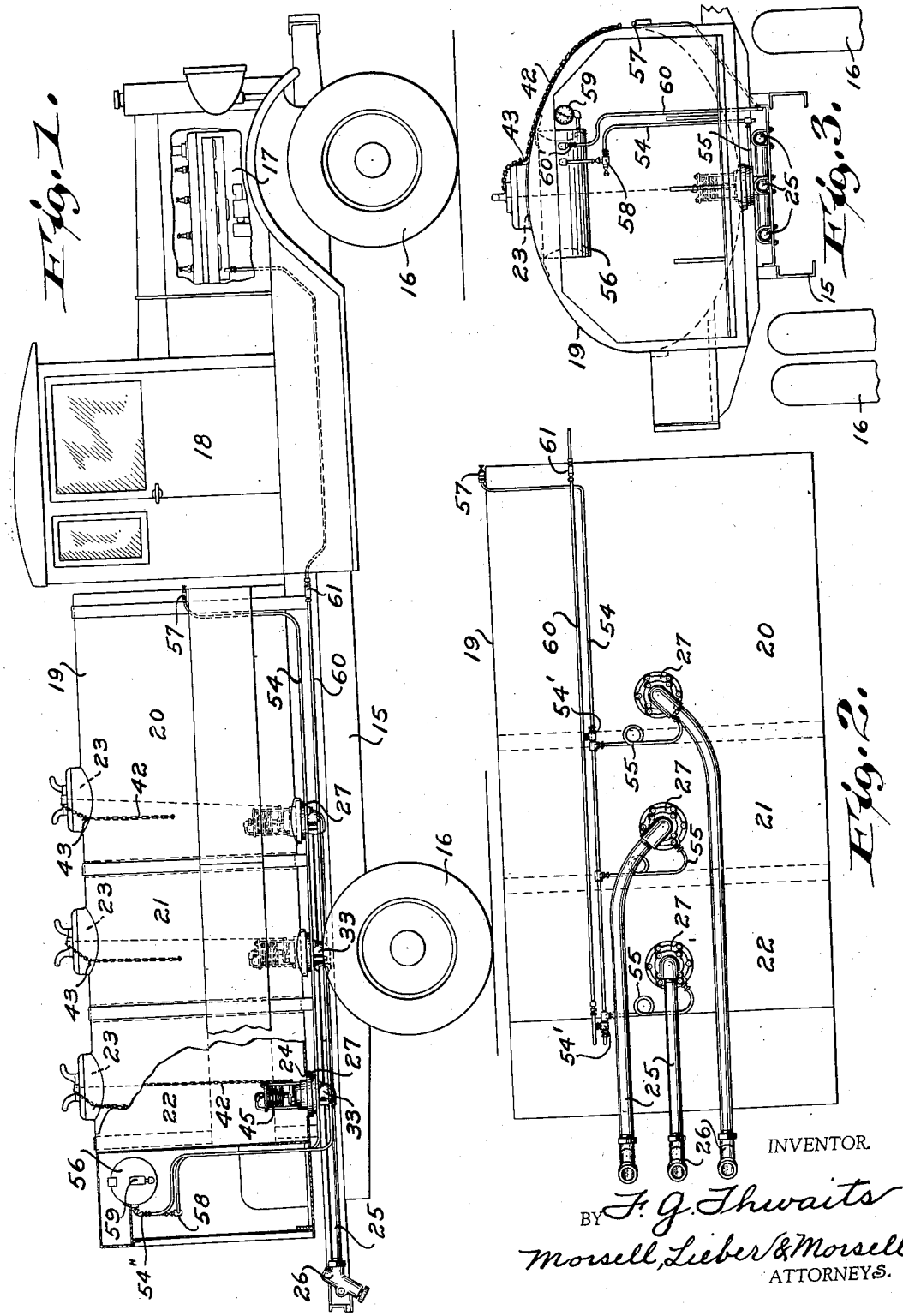
INVENTOR.
BY F. G. Thwaits
Morsell, Lieber & Morsell
ATTORNEYS.

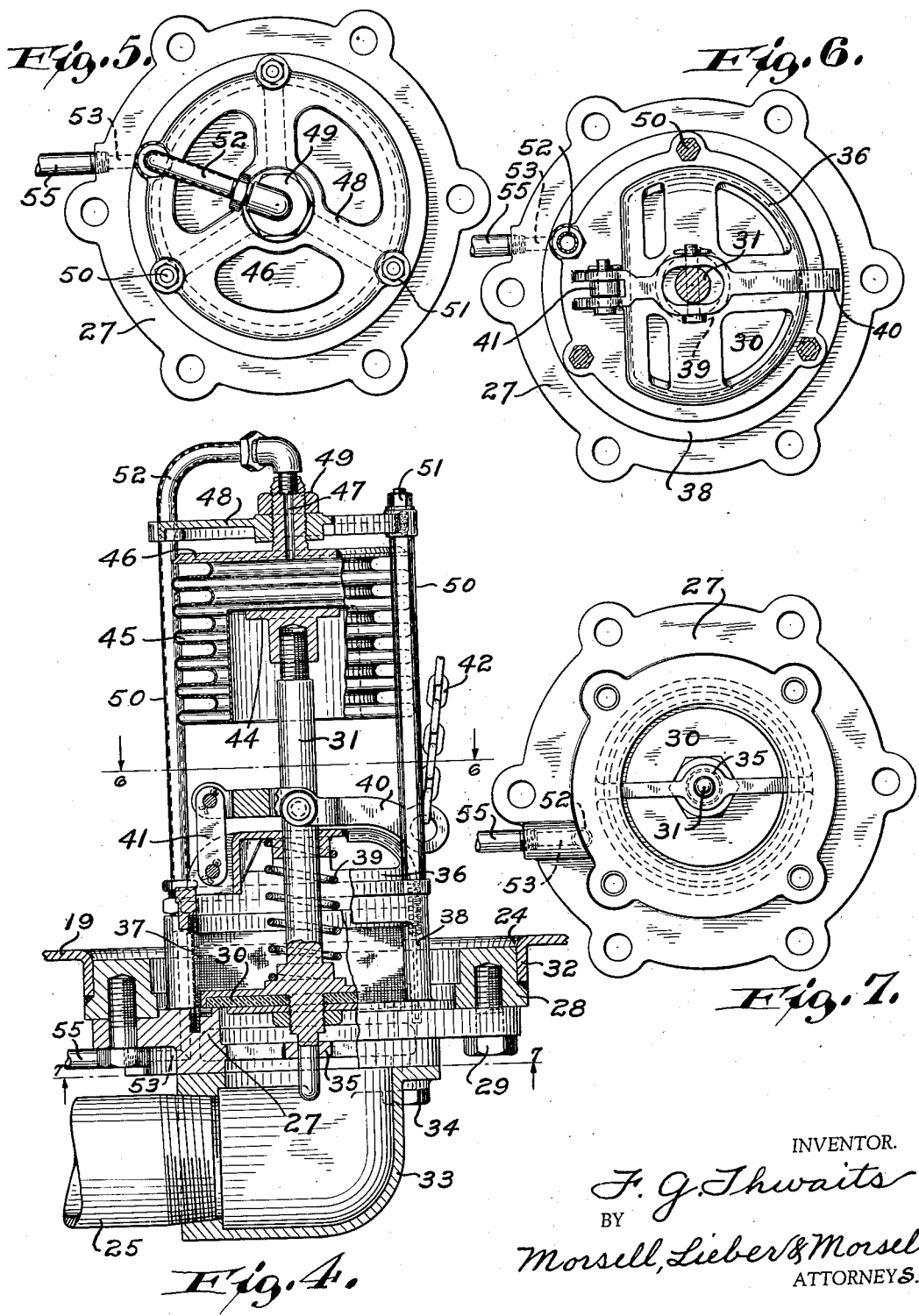

June 11, 1935.  F. G. THWAITS  2,004,715
VALVE MECHANISM
Filed Nov. 18, 1932    3 Sheets-Sheet 3
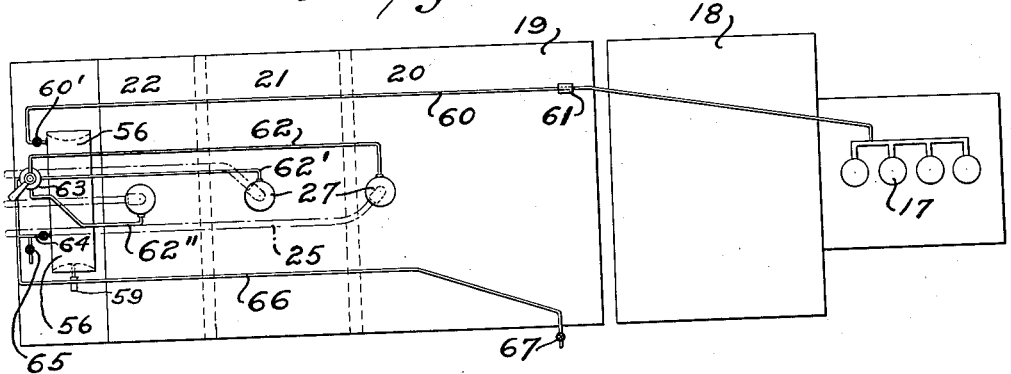
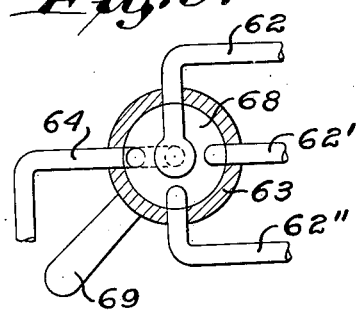
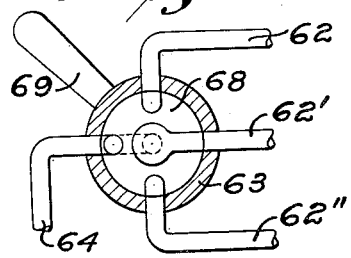
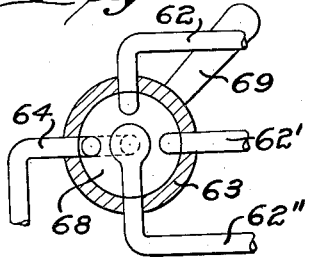
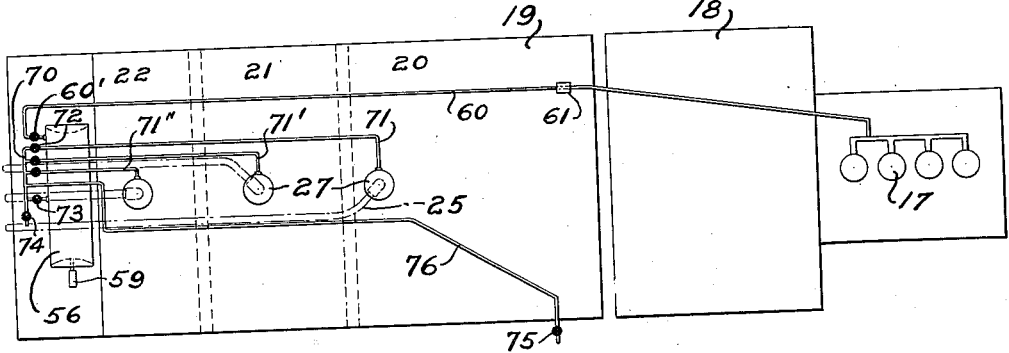
INVENTOR.
F. G. Thwaits
BY
Morsell, Lieber & Morsell
ATTORNEYS.

Patented June 11, 1935

2,004,715

UNITED STATES PATENT OFFICE 2,004,715

VALVE MECHANISM

Frederick G. Thwaits, Wauwatosa, Wis., assignor to The Heil Co., Milwaukee, Wis., a corporation of Wisconsin Application November 18, 1932, Serial No. 643,151

5 Claims. (Cl. 137—21)

The present invention relates in general to improvements in the art of liquid dispensation, and relates more specifically to improvements in the construction and operation of safety or emergency valve mechanism for liquid dispensing tanks or the like.

In the storage and transportation of liquid such as oil, with the aid of tank cars or trucks, it frequently becomes necessary to provide some means for automatically stopping the delivery of liquid from the tank so as to prevent undesirable escape of the fluid. The emergency shut-off means must be capable of automatic operation under certain conditions, and should also be subject to manual control independently of and without in any manner interfering with the usual faucet normally used for dispensing purposes. While it has heretofore been proposed to utilize hydraulically actuated safety or emergency valves for the foregoing purpose, these prior devices were not entirely satisfactory, because of the complicated construction thereof and due to their lack of flexibility in operation.

It is an object of the present invention to provide an improved emergency valve especially applicable to liquid dispensing tanks or reservoirs, which is simple and compact in construction and which is moreover highly efficient and flexible in operation.

Another object of the invention is to provide improved valve mechanism the operation of which is controlled by a vacuum such as the suction of an ordinary internal combustion engine usually employed for propelling a tank car or truck.

A further object of the invention is to provide a new and useful safety valve structure which can be readily installed within the liquid confining compartment of a tank or the like, and improved systems for controlling the actuation of a multiplicity of such valve structures.

Still another object of the invention is to provide an improved valve operable to close the same by mechanical means acting in opposition to atmospheric pressure, and which is capable of being either automatically or manually controlled from various remote points or stations.

These and other objects and advantages of the present improvement, will be apparent from the following detailed description.

A clear conception of one form of the improved valve mechanism and of several systems for effecting control of one or more of the improved devices, may be had by referring to the drawings accompanying and forming a part of this specification in which reference characters designate the same or similar parts in the various views:

Fig. 1 is a somewhat diagrammatic part sectional side elevation of a multiple compartment tank truck having a typical emergency valve control system applied therein;

Fig. 2 is a bottom view of the tank end of the truck shown in Fig. 1;

Fig. 3 is a rear end view of the tank truck of Figs. 1 and 2;

Fig. 4 is an enlarged part sectional view showing the details of construction of one of the improved valves and its mounting;

Fig. 5 is a top view of the valve and its mounting;

Fig. 6 is a transverse section through the valve mechanism, taken along the line 6—6 of Fig. 4;

Fig. 7 is a bottom view of the valve, taken along the line 7—7 of Fig. 4;

Fig. 8 is a diagram of a tank truck and of a modified safety valve system;

Fig. 9 is an enlarged diagram of the manual control valve for the system of Fig. 8, showing the control valve in one operating position;

Fig. 10 is a similar diagram of the control valve shifted to another operating position;

Fig. 11 is another similar diagram of the control valve showing the same shifted to still another operating position; and Fig. 12 is another diagram of a tank truck equipped with a further modified emergency valve system.

Referring to the typical tank truck and liquid dispensing system illustrated in Figs. 1, 2 and 3, the truck is of ordinary construction comprising a chassis 15 supported by wheels 16, and a propelling internal combustion engine 17 mounted upon the chassis forwardly of the usual driver's cab 18. A multiple compartment liquid storage tank 19 is mounted upon the chassis 15 in back of the cab 18, this tank being subdivided by partitions into separate compartments 20, 21, 22, each having an upper manhole 23 and a lower liquid discharge opening 24. The lower opening 24 of each tank compartment, is provided with an emergency valve mechanism of the improved type, and with a liquid conducting pipe 25 leading to a dispensing faucet 26 of any desired type.

The improved emergency valve mechanism is shown in detail in Figs. 4 to 7 inclusive, and comprises an annular valve seat 27 registering with each of the discharge openings 24 and rigidly attached to a mounting ring 28 by cap screws 29; and a disk valve 30 cooperable with the seat 27 and movably supported concentrically thereof by means of a stem 31. The mounting ring 28 may be welded to a depending integral annular flange 32 of the tank 19, and the corresponding liquid conducting pipe 25 is connected to an elbow fitting 33 which is attached to the bottom of the valve seat 27 by cap screws 34. The central portion 35 of the seat 27 forms a guide for the reduced lower end of the stem 31, and the medial portion of this stem is guided in a removable reaction member 36 coacting with an annular screen 37 surrounding the zone of movement of the valve 30 and located within a protecting cage 38 formed integral with the seat and spanning the gap between the seat 27 and member 36. A compression spring 39 surrounding the valve stem 31, coacts with the top of the valve 30 and reacts against the lower central portion of the member 36, thus constantly tending to urge the valve toward its seat 27. Liquid from within the tank 19 is free to flow past the valve 30 when open, through openings in the member 36 and through the screen 37, the latter normally functioning to prevent sediment from entering the zone of movement of the valve.

A lever 40 has one end pivotally attached to the upper end of a link 41 the lower end of which is pivotally mounted upon one side of the member 36, and the medial portion of this lever 40 surrounds and is pivotally connected to the valve stem 31 directly above the member 36. The opposite free end of the lever 40 is connected to a chain 42 extending upwardly through the corresponding manhole 23 and adapted to be connected to a hook 43 at the side of the tank 19, in order to hold the valve 30 open. The chain 42 is normally released so as to permit unobstructed opening and closing of the valve 30, but each valve may be positively manually opened and held in open position against the action of the spring 39, with the aid of the chain 42 and hook 43.

The upper extremity of the valve stem 31, is provided with an adjustable element 44 secured to the lower end of a vacuum actuated bellows 45 the upper end of which is attached to a plate 46 having a central duct 47 therethrough. The plate 46 is fixedly but adjustably mounted in a spider 48 by means of a nut 49, and the spider is rigidly supported above the valve seat 27 by hexagonal spacing rods 50 and nuts 51, the former of which are threaded into the cage 38 and clamp the member 36 thereto. A pipe 52 communicates with the central duct 47 and extends downwardly therefrom to the seat 27 where the lower pipe end connects with a port 53 formed in the seat. The construction of the bellows 45 is obviously such that when the internal pressure is reduced below atmospheric, the external air pressure acting upon the metallic folds of the bellows will tend to raise and open the valve 30 in opposition to the closing effort produced by the spring 39; and when the pressures within and without the bellows 45 are equalized, the spring 39 becomes effective to close the valve 30.

Reverting now to Figs. 1, 2 and 3, it will be noted that in the system therein illustrated, each tank compartment 20, 21, 22 is provided with one of the emergency valve mechanisms just described, and the ports 53 of these mechanisms are connected to a common pipe line 54 by laterals 55. The pipe line 54 has fusible sections 54' therein so as to insure rupture of the line when subjected to excessive heat. The rear end of the pipe line 54 is connected to a reservoir 56 mounted at the end of the main tank 19, and manually operable vent valves 57, 58 are provided at the front and rear ends respectively of the pipe line 54, for the purpose of establishing atmospheric pressure within this line and in the several bellows 45 communicating therewith. The pipe line 54 also has a control valve 54" therein for establishing communication between the reservoir 56 and the line 54, and this valve 54" is normally closed when the engine 17 is operating to establish the desired vacuum in the reservoir 56. The reservoir 56 may be provided with a pressure gage 59 for indicating when the valves 30 are open, and is connected with the intake manifold of the engine 17, by means of a pipe 60 which may have an insulator 61 therein for protective purposes. The pipe 60 also has a check valve 60' therein near the reservoir 56 in order to maintain the desired vacuous condition within the reservoir 56.

During normal use of the control system of Figs. 1 to 3 inclusive, operation of the engine 17 results in establishment of a partial vacuum within the reservoir 56 through the pipe 60 and valve 60', and when this reservoir is placed in open communication with the pipe line 54 by operation of the valve 54", the reduced pressure within the bellows 45 of each valve mechanism, automatically causes these bellows to open the valves 30 in opposition to the action of the springs 39 and to hold the valves open, as long as such reduction in pressure is maintained. The liquid from within any of the compartments 20, 21, 22 may then be drawn off by opening the faucets 26, without interference by the emergency valve mechanisms. If, however, for any reason such as opening of the valves 57, 58 or breaking of the pipe line 54 or destruction of the fusible sections 54', the pressure within the bellows 45 is increased to that of the ambient atmosphere, the springs 39 will immediately become effective to close the valves 30 and to prevent further escape of liquid from the compartments 20, 21, 22. The valves 30 can then be opened only by manipulation of the chains 42 and levers 40, unless the necessary vacuous condition is re-established in the pipe line 54 by operation of the valve 54". While the reduced pressure within the reservoir 56 is preferably established by utilizing the suction of the vehicle propelling engine 17, other means may be employed for this purpose, and it has been found that by utilizing a reservoir 56 of sufficient capacity in conjunction with a control valve 54", numerous operations of the valves 30 are possible even though the engine 17 is idle for a considerable period of time.

Referring specifically to the modified valve control system of Figs. 8, 9, 10 and 11, the valve mechanisms of this system may be automatically actuated independently of each other. In the modified system, the port 53 of each valve seat 27 is connected by a pipe 62, 62', 62", to a common control valve casing 63. The valve casing 63 is also connected through a pipe line 64, with the reservoir 56 which is connected to the engine 17 by a pipe 60 having a check valve 60' therein, as in Fig. 1, and has a pressure gage 59 associated therewith for indicating when the valves 30 have been fully opened. The pipe line 64 may be provided with a valve 65, and a branch pipe 66 communicating with the line 64 may be provided with a similar valve 67, for manually establishing atmospheric pressure within the pipe line 64. The casing 63 houses a rotary valve 68 operable by a handle 69 as shown diagrammatically in Figs. 9 to 11 inclusive.

During normal operation of the modified system of Figs. 8 to 11 inclusive, the reservoir 56 is maintained in vacuous condition through the pipe 60 by operation of the engine 17. When the valve 68 is positioned within the casing 63 as shown in Fig. 9, the pipes 62', 62'' are under atmospheric pressure, and the pipe 62 is in open communication with the vacuum reservoir 56 through the pipe 64, thereby opening the valve 30 in the front tank compartment 20. With the emergency valve 30 of the compartment 20 thus opened, the valves 30 of the remaining compartments 21, 22 remain closed, and liquid can be withdrawn through the corresponding pipe 25 and faucet 26 only from the compartment 20. When the valve 68 is positioned as shown in Fig. 10, the pipes 62, 62'' are connected to the atmosphere while the pipe 62' is in direct communication with the reservoir 56, thus sealing the valves 30 in the end compartments 20, 22 and opening the emergency valve of the intermediate compartment 21 so as to permit drainage of liquid only from this latter compartment. When the valve 68 is positioned as indicated in Fig. 11, the pipes 62, 62' are open to the atmosphere and the pipe 62'' communicates with the reservoir 56, thereby closing the emergency valves 30 of the two forward compartments 20, 21 and lifting the valve of the rear compartment 22 to permit withdrawal of liquid only therefrom. It will thus be noted that with this system of control, only one of the emergency valves 30 is open at any time, thus making only one compartment 20, 21, 22 available for withdrawal of liquid, and by turning the valve 68 an additional ninety degrees in a clockwise direction from the position shown in Fig. 11, or by opening either of the valves 65, 67, all of the emergency valves 30 may be sealed.

Referring specifically to the further modified control system of Fig. 12, each of the emergency valves 30 is communicable with a common header 70 through a pipe 71, 71', 71'', and each of these pipes has an independent control valve 72 therein. The header 70 communicates with the reservoir 56 past a valve 73, and is adapted to be connected to the atmosphere by means of a valve 74 at one end of the header and by a valve 75 disposed in a branch pipe 76 leading from the header to the forward side portion of the tank 19. The reservoir 56 is provided with a gage 59 and is connected to the intake manifold of the engine 17 by a pipe 60, as in the previously described systems.

During normal operation of the further modified system of Fig. 12, the reservoir 56 is in open communication with the engine 17 which when operating, establishes the desired vacuous condition in the reservoir. When the valve 73 is open and the valves 74, 75 are closed, one or more of the valves 72 may be opened in order to open the emergency valves 30 in the corresponding compartments 20, 21, 22. If all of the valves 72 are opened, all of the emergency valves will likewise be open, and the valves 74, 75 may be manipulated at any time so as to automatically close those emergency valves which are open.

From the foregoing description it will be apparent that the present invention provides an automatic emergency valve mechanism which will function to close the valves 30 if atmospheric pressure is established within the bellows 45 thereof, either intentionally as by opening the atmospheric control valves, or accidentally as by rupture of the pipes leading to the valve seats 27 or as by melting of the fusible sections 54'. The use of either of the three systems specifically illustrated and described, provides a wide range of variation in the mode of controlling the operation of the valves 30, and the vehicle propelling engine 17 furthermore provides simple and effective means for establishing the desired vacuum in the reservoir 56 past the check valve 60'. When the control valve 54'' is operated, the desired vacuous condition is immediately established in the bellows 45 which may thereafter be cut off from the reservoir 56 by closing of the valve 54''. The chains 42 also enable actuation of the valves 30 in case no reduced pressure is available in the reservoir 56, and while the invention has been shown as being applied to a three compartment tank truck, it is obviously more generally applicable. The improved emergency valve mechanism is simple and compact in construction, and has proven highly efficient and quick acting, in commercial operation.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:

1. In combination, a tank having a fluid outlet, a valve associated with said outlet and having a stem extending into said tank, said valve comprising a fixed seat and a movable valve member secured to one end of said stem, a spring coacting with a fixed abutment rigidly attached to said seat and directly with said valve member for closing the valve, a bellows operable by ambient fluid pressure within said tank to open said valve, said bellows having normally fixed and movable opposite ends the former of which is adjustably associated with said valve seat and the latter of which is connected directly to the opposite end of said stem, and a manually operable lever pivotally attached to said fixed abutment and to said stem between said movable bellows end and said spring for independently opening said valve.

2. In combination, a tank having a fluid outlet, a valve comprising a seat rigidly attached to said tank at said outlet and a member movable relative to said seat, said member having a stem extending into said tank, a spring surrounding said stem and coacting with a fixed abutment carried by said seat and directly with said valve member for closing the valve, a bellows within said tank operable by ambient fluid pressure within the latter to open said valve, said bellows having a normally fixed end adjustably supported by said valve seat and having a movable opposite end adjustably connected directly to the end of said stem remote from said valve member, and a manually operable lever pivotally supported by said abutment and coacting with said stem between said movable bellows end and said spring for independently opening said valve.

3. In combination, a tank having a fluid outlet, a valve associated with said outlet and having a stem extending through said outlet and into said tank, said valve comprising a normally fixed seat removably attached to the exterior of said tank beyond said outlet and a movable valve member secured to one end of said stem, a spring coacting with a normally fixed abutment carried by said seat and with said valve member for closing said valve, a bellows operable by ambient fluid pressure within said tank to open said valve, said bellows having normally fixed and movable opposite ends the former of which is normally fixedly connected to said valve seat and the latter of which is connected to the opposite end of said stem, and manually operable means coacting with said stem between said bellows and said spring for independently actuating said valve.

4. In combination, a tank having a fluid outlet, a valve comprising a seat rigidly detachably attached to the exterior of said tank beyond said outlet, and a member movable relative to said seat, said member having a stem extending through said outlet and into said tank, a spring surrounding said stem and coacting with a normally fixed abutment carried by said seat and with said valve member for closing said valve, a bellows within said tank operable by ambient fluid pressure within the latter to open said valve, said bellows having a normally fixed end carried by said valve seat and having a movable opposite end connected to the end of said valve stem remote from said valve member, and manually operable means coacting with said abutment and with said stem between said movable bellows end and said spring for independently actuating said valve.

5. In combination, a tank having a fluid outlet and a ring member attached thereto at said outlet, a valve comprising a seat normally rigidly and detachably secured to said ring member beyond said outlet and a member movable relative to said seat, said member having a stem extending through said outlet and into said tank, a spring coacting with a normally fixed portion of said seat and with said valve member for closing said valve, a bellows operable by ambient fluid pressure within said tank to open said valve, said bellows having a normally fixed end carried by said valve seat and having a movable opposite end recessed to receive and directly connected to the end of said stem and remote from said valve member, and a manually operable lever coacting with said seat and with said stem between said movable bellows end and said spring for independently actuating said valve.

FREDERICK G. THWAITS.